United States Patent
Iwamura et al.

(10) Patent No.: US 8,923,200 B2
(45) Date of Patent: Dec. 30, 2014

(54) MOBILE COMMUNICATION METHOD, RADIO BASE STATION, AND MOBILE STATION

(75) Inventors: Mikio Iwamura, Tokyo (JP); Anil Umesh, Tokyo (JP)

(73) Assignee: NTT DoCoMo, Inc., Tokyo (JP)

(*) Notice: Subject to any disclaimer, the term of this patent is extended or adjusted under 35 U.S.C. 154(b) by 0 days.

(21) Appl. No.: 13/520,943

(22) PCT Filed: Jan. 7, 2011

(86) PCT No.: PCT/JP2011/050213
§ 371 (c)(1),
(2), (4) Date: Sep. 12, 2012

(87) PCT Pub. No.: WO2011/083863
PCT Pub. Date: Jul. 14, 2011

(65) Prior Publication Data
US 2013/0003657 A1 Jan. 3, 2013

(30) Foreign Application Priority Data
Jan. 8, 2010 (JP) .................................. 2010-003376

(51) Int. Cl.
*H04W 4/00* (2009.01)
*H04W 56/00* (2009.01)
*H04L 5/00* (2006.01)
*H04L 27/26* (2006.01)

(52) U.S. Cl.
CPC ........... *H04W 56/0045* (2013.01); *H04L 5/001* (2013.01); *H04L 27/2646* (2013.01)
USPC ....................................................... 370/328

(58) Field of Classification Search
CPC H04L 5/001; H04L 27/2646; H04W 56/0045
USPC .......................................... 370/206, 241, 328
See application file for complete search history.

(56) References Cited

U.S. PATENT DOCUMENTS

| 8,385,186 B2 | 2/2013 | Ishii et al. | |
|---|---|---|---|
| 2010/0325226 A1* | 12/2010 | McBeath et al. | 709/206 |
| 2012/0213089 A1* | 8/2012 | Shi et al. | 370/241 |
| 2012/0218988 A1* | 8/2012 | Xu et al. | 370/350 |

FOREIGN PATENT DOCUMENTS

KR  10-2009-0095670 A   9/2009

OTHER PUBLICATIONS

TSG-RAN WG4, "reply LS on RAN2 status on carrier aggregation", 3GPP TSG RAN WG4 Meeting #52 R4-093322, Aug. 28, 2009, pp. 1-3.*

Huawei, "Different ATiming Advnace Impact on Carrier Aggregation", 3GPP TSG RAN WG2 Meeting #67 bis R2-095815, Oct. 16, 2009, pp. 1-3.*

(Continued)

*Primary Examiner* — Jung Park
*Assistant Examiner* — Albert Shih
(74) *Attorney, Agent, or Firm* — Osha Liang LLP

(57) ABSTRACT

The present invention relates to a mobile communication method, in which a mobile station UE transmits uplink signals to a radio base station eNB using a plurality of "Component Carriers" having different carrier frequencies, includes a step A of transmitting, by the radio base station eNB, TA to be applied to the plurality of "Component Carriers", to the mobile station UE, and a step B of adjusting, by the mobile station UE, transmission timings of the uplink signals on the plurality of "Component Carriers" based on the received TA.

3 Claims, 5 Drawing Sheets

(56) References Cited

OTHER PUBLICATIONS

NTT DoCoMo, Inc., NEC, "MAC PDU structure for LTE", 3GPP TSG RAN WG2 #59 R2-073560, Aug. 24, 2007, pp. 1-4.*
Written Opinion for International Application No. PCT/JP2011/050213 mailed Feb. 8, 2011, with English translation thereof (9 pages).
Notice of Grounds for Rejection for Japanese Patent Application No. 2010-003376 mailed Jul. 17, 2012, with English translation thereof (5 pages).
NTT DoCoMo, Inc., NEC, "MAC PDU structure for LTE," 3GPP TSG RAN WG2 #59, R2-073560, Athens, Greece, Aug. 20-24, 2007 (4 pages).
International Search Report w/translation from PCT/JP2011/050213 dated Feb. 8, 2011 (5 pages).
TSG RAN WG4, "Reply LS on RAN2 status on carrier aggregation", 3GPP TSG RAN WG4 Meeing #52; R4-093322, Aug. 24-28, 2009 (3 pages).
Huawei, "Different Timing Advance Impact on Carrier Aggregation", 3GPP TSG RAN WG2 Meeting #67bis; R2-095815, Oct. 12-16, 2009 (3 pages).
Huawei, "Carrier aggregation in LTE-Advanced", 3GPP TSG RAN WG1 Meeting #55; R1-084346, Nov. 10-14, 2008 (6 pages).
3GPP TR 36.814 V1.5.0; "3rd Generation Partnership Project; Technical Specification Group Radio Access Network; Further Advancements for E-UTRA Physical Layer Aspects (Release 9)", Nov. 2009 (53 pages).
3GPP TS 36.321 V9.1.0; 3rd Generation Partnership Project; Technical Specification Group Radio Access Network; Evolved Universal Terrestrial Radio Access (E-UTRA) Medium Access Control (MAC) protocol specification (Release 9), Dec. 2009 (48 pages).
Decision to Grant a Patent in related Japanese Application No. 2010-003376 mailed Oct. 9, 2012 (3 pages).
Registered claims of Japanese Application No. 2010-003376 (2 pages).
Official Action in counterpart Korean Patent Application No. 10-2012-7017797 issued Nov. 28, 2013 (7 pages).
Office Action in a counterpart Chinese Patent Application No. 201180005637.4 issued on May 5, 2014 (7 pages).
Office Action in counterpart Canadian Patent Application No. 2,787,776 issued Jul. 24, 2014 (3 pages).

* cited by examiner

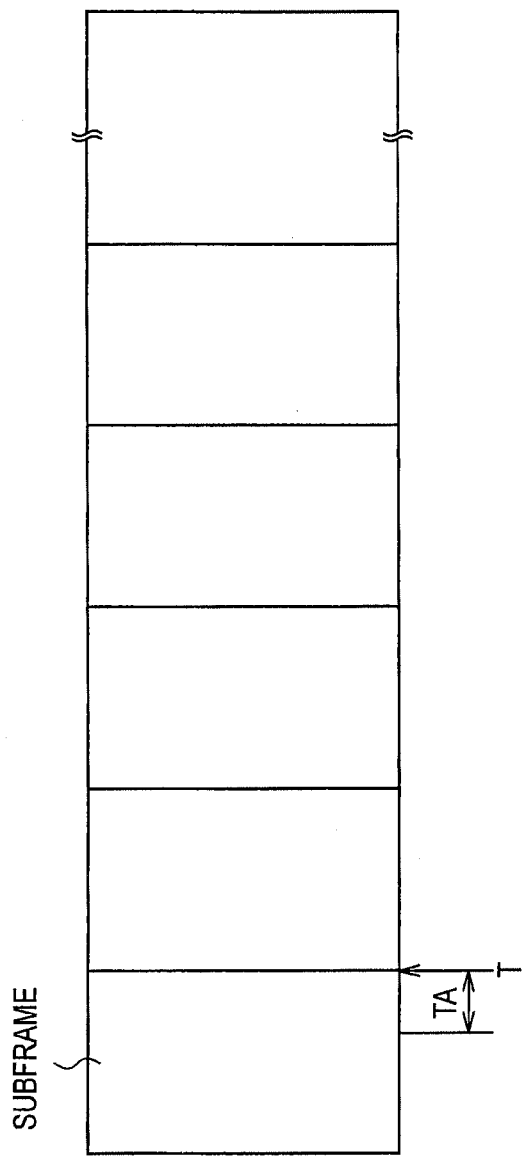

MOBILE COMMUNICATION METHOD, RADIO BASE STATION, AND MOBILE STATION

This application is a national stage application of PCT/JP2011/050213 filed Jan. 7, 2011, which claims priority to Japanese Priority Application No. 2010-003376 filed on Jan. 8, 2010, the entire contents of which are hereby incorporated by reference.

TECHNICAL FIELD

The present invention relates to a mobile communication method, a radio base station, and a mobile station.

BACKGROUND ART

In an LTE (Long Term Evolution)-Advanced scheme for which the 3GPP is developing standardization, "CA (Carrier Aggregation)" has been discussed.

When the CA is being performed in a mobile station UE, the mobile station UE is configured to transmit an uplink signal to a radio base station eNB by using a plurality of "Component Carriers (CCs)" having different carrier frequencies.

However, a problem was that as shown in FIG. 1, when CA is performed in a mobile station UE by using "Component Carriers (for example, CC #1 and CC #11)" in cells having a different coverage (for example, a cell #1 and a cell #11), and as shown in FIG. 2, when CA is performed in a mobile station UE by using a "Component Carrier (for example, CC #1)" in a cell #1 in which a repeater is not used, and a "Component Carrier (for example, CC #2)" in a cell #2 in which a repeater #2 is used, the reception timing of an uplink signal in the radio base station eNB varies immensely in each "Component Carrier".

SUMMARY OF THE INVENTION

Therefore, the present invention has been achieved in view of the above problem, and an object thereof is to provide a mobile communication method, a radio base station, and a mobile station by which the reception timing of an uplink signal in a radio base station eNB can be maintained within a constant range even when CA is performed.

A first characteristic of the present embodiment is summarized in that a mobile communication method, in which a mobile station transmits uplink signals to a radio base station using a plurality of carriers having different carrier frequencies, the method comprising, a step A of transmitting, by the radio base station, transmission timing adjustment information to be applied to the plurality of carriers, to the mobile station, and a step B of adjusting, by the mobile station, transmission timings of the uplink signals on the plurality of carriers based on the received transmission timing adjustment information.

A second characteristic of the present embodiment is summarized in that a radio base station, which is configured to receive uplink signals transmitted using a plurality of carriers having different carrier frequencies from a mobile station, comprising, a transmission unit configured to transmit transmission timing adjustment information to be applied to the plurality of carriers to the mobile station.

A third characteristic of the present embodiment is summarized in that a mobile station, which is configured to transmit uplink signals to a radio base station using a plurality of carriers having different carrier frequencies, comprising, a reception unit configured to receive transmission timing adjustment information to be applied to the plurality of carriers from the radio base station, and a transmission unit configured to adjust transmission timings of the uplink signals on the plurality of carriers based on the received transmission timing adjustment information.

As described above, according to the present invention, it is possible to provide a mobile communication method, a radio base station, and a mobile station by which the reception timing of an uplink signal in a radio base station eNB can be maintained within a constant range even when CA is performed.

BRIEF DESCRIPTION OF DRAWINGS

FIG. 5 is a diagram explaining a transmission timing of an uplink signal by the mobile station according to the first embodiment of the present invention.

DESCRIPTION OF EMBODIMENTS (Mobile Communication System According to First Embodiment of the Present Invention)

With reference to FIG. 1 to FIG. 5, the configuration of a mobile communication system according to a first embodiment of the present invention will be described.

The mobile communication system according to the present embodiment is a mobile communication system of the LTE-Advanced scheme, and is configured to enable CA by a mobile station UE.

Figure 1:
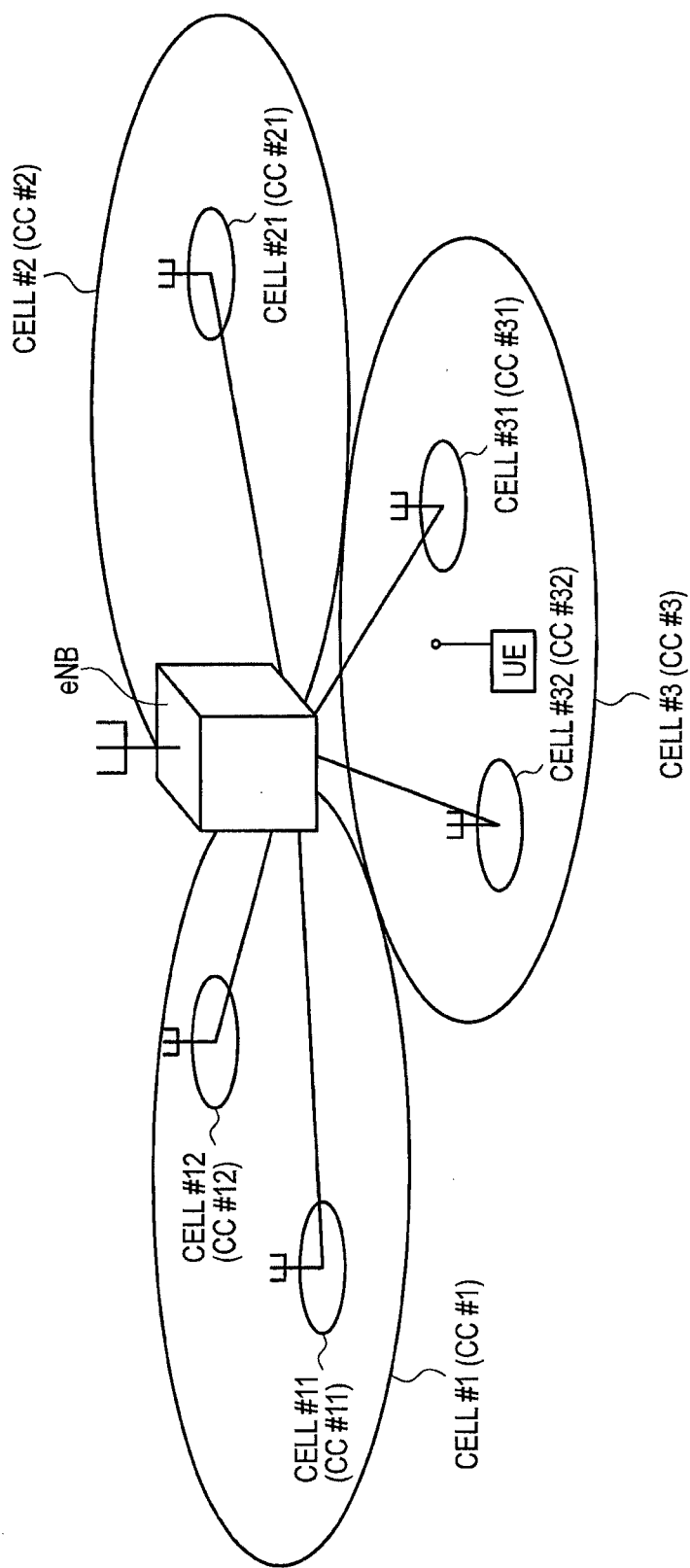
FIG. 1 is a diagram showing the entire configuration of a mobile communication system according to a first embodiment of the present invention.
Figure 2:
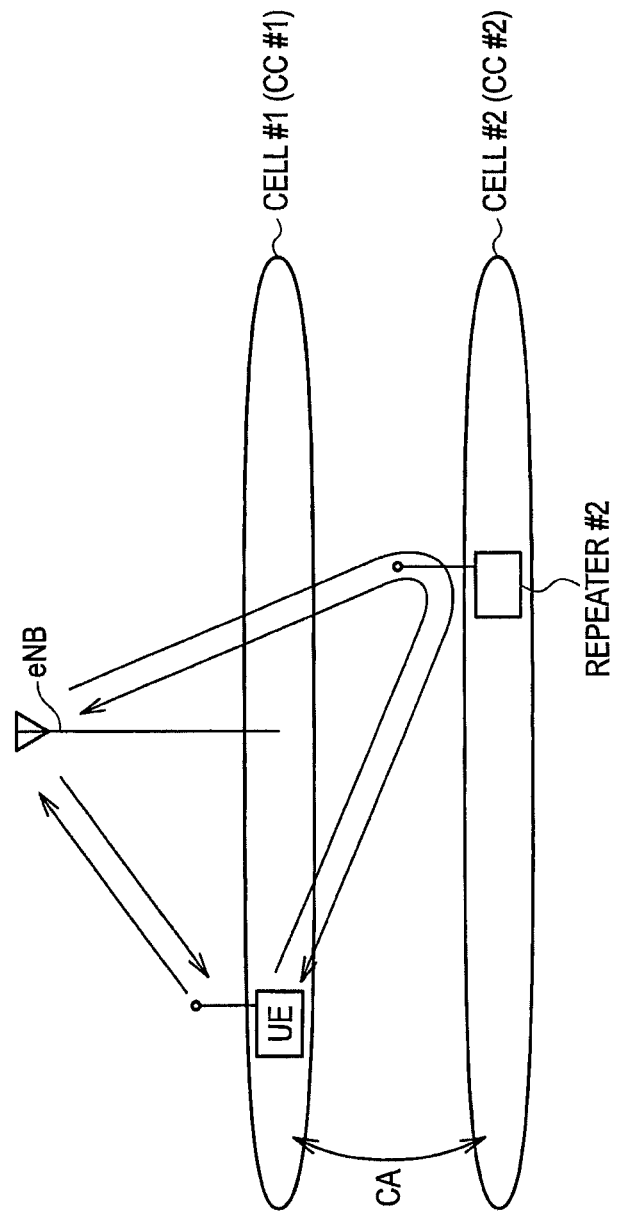
FIG. 2 is a diagram illustrating the entire configuration of the mobile communication system according to the first embodiment of the present invention.

For example, the mobile communication system according to the present embodiment may have a configuration as shown in FIG. 1, or a configuration as shown in FIG. 2, or any other configuration.

In the configuration shown in FIG. 1, a cell #1, a cell #2, and a cell #3 are provided as macro cells, and a cell #11, a cell #12, a cell #21, a cell #31, and a cell #32 are provided as flared cells subordinate to a radio base station eNB.

In this case, the cell #11 and the cell #12 are provided within the coverage of the cell #1, the cell #21 is provided within the coverage of the cell #2, and the cell #31 and the cell #32 are provided within the coverage of the cell #3.

Furthermore, CC (Component Carrier) #1 is used in the cell #1, CC #2 is used in the cell #2, CC #3 is used in the cell #3, CC #11 is used in the cell #11, CC #12 is used in the cell #12, CC #21 is used in the cell #21, CC #31 is used in the cell #31, and CC #32 is used in the cell #32.

For example, the CC #1, the CC#2, and the CC #3 are "Component Carriers" having a carrier frequency in the 2-GHz band, and the CC#11, the CC #12, the CC #21, the CC #31, and the CC #32 may be "Component Carriers" having a carrier frequency in the 3.5-GHz band.

For example, the bandwidth of the "Component Carriers" may be any one of 6 RB (Resource Blocks), 15 RB, 25 RB, 50 RB, 75 RB, or 100 RB. Note that 1 RB equals 180 kHz.

Furthermore, in the configuration illustrated in FIG. 2, a cell #1 and a cell #2 are provided as macro cells subordinate to the radio base station eNB. The CC #1 is used in the cell #1, and the CC #2 is used in the cell #2.

For example, both the CC #1 and the CC #2 may be "Component Carriers" having a carrier frequency in the 2-GHz band (or 3.5-GHz band). Alternatively, the CC #1 may be a "Component Carrier" having a carrier frequency in the 2-GHz band (or 3.5-GHz band), and the CC #2 may be a "Component Carrier" having a carrier frequency in the 3.5-GHz band (or 2-GHz band).

In this case, a repeater (that is, booster) is not installed in the cell #1, and a repeater #2 is installed in the cell #2.

Figure 3:
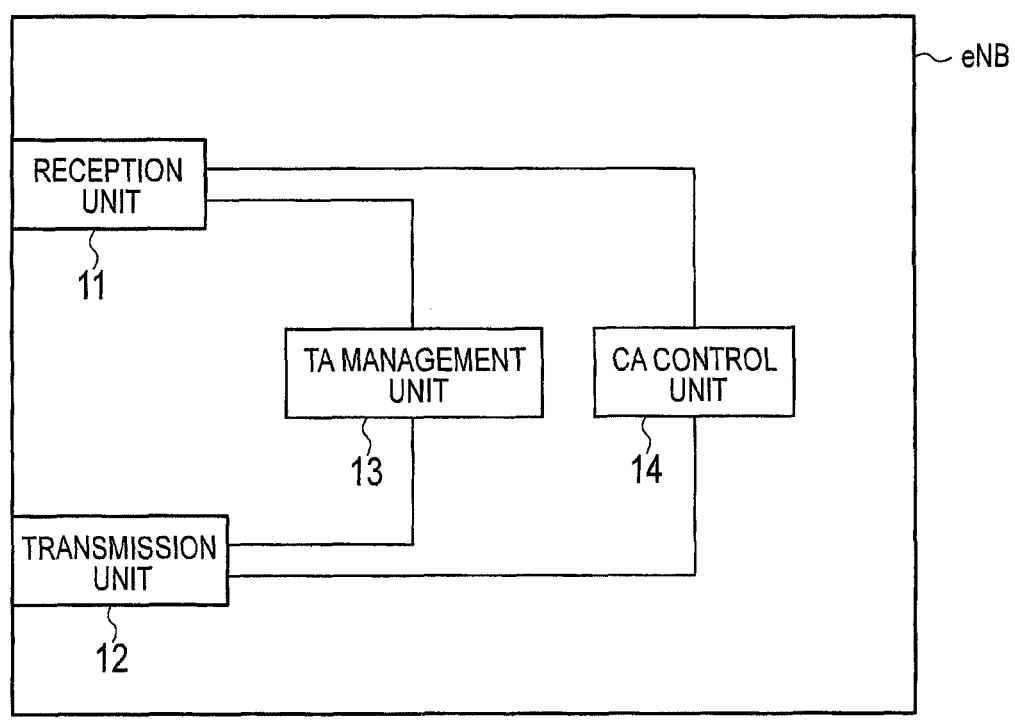
FIG. 3 is a functional block diagram of a radio base station according to the first embodiment of the present invention.

As illustrated in FIG. 3, the radio base station eNB includes a reception unit 11, a transmission unit 12, a TA management unit 13, and a CA control unit 14.

The reception unit 11 is configured to receive an uplink data signal or an uplink control signal, which have been transmitted through PUSCH (Physical Uplink Shared Channel) on a plurality of "Component Carriers" having different carrier frequencies, from a mobile station UE.

The CA control unit 14 is configured to manage whether each mobile station UE performs CA.

The TA management unit 13 is configured to assign and manage TA (Timing Advance, transmission timing adjustment information) that should be applied to each CC used in each mobile station UE in which CA is performed.

In this case, the TA management unit 13 may be configured to assign the same TA to a plurality of "Component Carriers" processed by the same receiver (IFFT: Inverse Fast Fourier Transform; inverse Fourier transformer) within each mobile station UE in which CA is performed.

That is, the TA management unit 13 may be configured to assign only a single TA to a mobile station UE in which only "contiguous CA" is performed. In this case, the "contiguous CA" is CA processed by a single receiver (IFFT).

In "Component Carriers" processed by the same receiver (IFFT), if separate TAs are used, the orthogonality among the OFDM subcarriers spanning the "Component Carriers" is no longer maintained, and therefore, the same TA must be used. Therefore, the above configuration is achieved.

On the other hand, the TA management unit 13 may be configured to assign different TAs to a plurality of "Component Carriers" processed by different receivers (IFFT) within each mobile station UE in which CA is performed.

That is, the TA management unit 13 is configured to independently assign TA to each of the plurality of "Component Carriers" for which a "non-contiguous CA" is to be performed, in a mobile station UE in which the "non-contiguous CA" is performed. In this case, the "non-contiguous CA" is CA processed by a plurality of receivers (IFFT).

The transmission unit 12 is configured to transmit the TA assigned to each of the plurality of "Component Carriers", to the mobile station UE in which CA is performed.

Furthermore, the transmission unit 12 may be configured to transmit the aforementioned TA to the mobile station UE in which CA is performed using "CE (Control Element)" in a "MAC (Media Access Control) layer".

The transmission unit 12 may be configured to transmit the aforementioned TA to the mobile station UE in which CA is performed, via an "Anchor Carrier".

In this case, an Anchor Carrier may be defined as a carrier, from among a plurality of "Component Carriers", to which a PDCCH (Physical Downlink Control Channel) signal is transmitted, or a carrier to which a PHICH (Physical HARQ Indicator Channel) signal is transmitted, or a carrier to which a downlink signal, in which a "Semi-persistent Scheduling" has been applied, is transmitted, or a carrier to which a PHICH signal corresponding to a PUSCH signal (uplink data signal), in which a "Semi-persistent Scheduling" has been applied, is transmitted, or a carrier to which a paging signal is transmitted, or a carrier to which a DCCH (Dedicated Control Channel) signal is transmitted, or else a carrier for which measurement (Measurement) is performed. Alternatively, the Anchor Carrier may be defined by a combination of the aforementioned definitions.

The aforementioned DCCH signal may include a "Measurement Report (measurement report)", a "Handover Command (handover command signal)", or a "Handover Complete (handover complete signal)".

Furthermore, the "Anchor Carrier" may be called the "Main Carrier".

The transmission unit 12 may be configured to transmit the aforementioned TA to the mobile station UE in which CA is performed, via any carrier other than the Anchor Carrier.

Furthermore, the transmission unit 12 may be configured to specify a carrier for transmitting the aforementioned TA, by an individual control signal or a broadcast signal.

Figure 4:
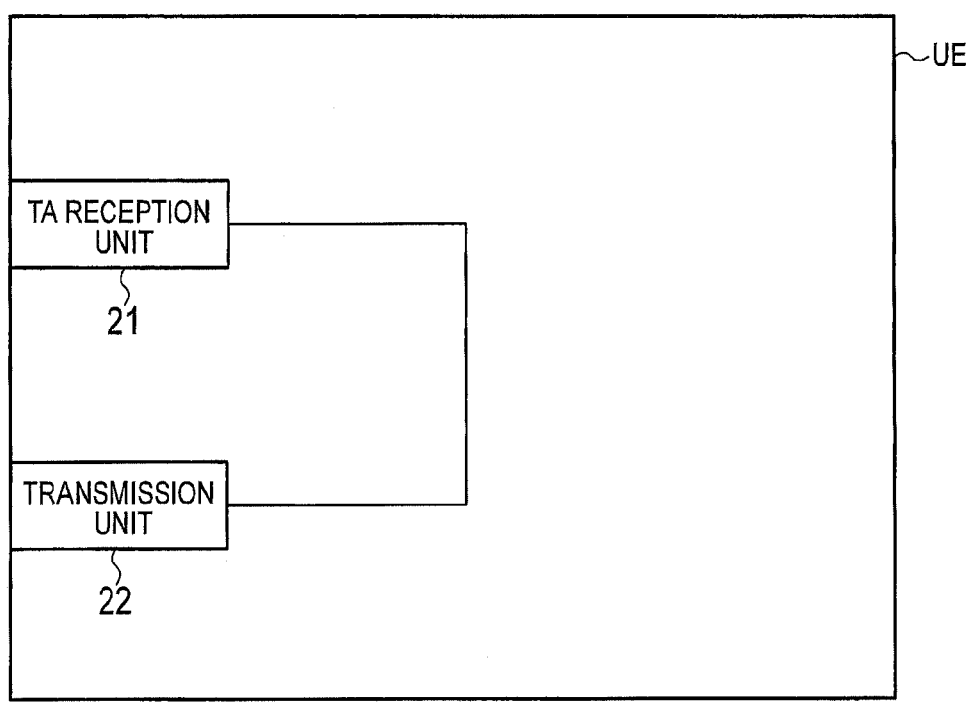
FIG. 4 is a functional block diagram of a mobile station according to the first embodiment of the present invention.

As illustrated in FIG. 4, the mobile station UE includes a TA reception unit 21 and a transmission unit 22.

The TA reception unit 21 is configured to receive TA, which is to be applied to each of a plurality of "Component Carriers", from the radio base station eNB.

The TA reception unit 21 may be configured to extract the aforementioned TA from a received "Control Element" which indicates a "TA Command" in the "MAC layer".

Furthermore, the TA reception unit 21 may also be configured to receive the aforementioned TA through the anchor carrier.

The transmission unit 22 is configured to transmit an uplink data signal or an uplink control signal to the radio base station eNB through PUSCH or PUCCH on a plurality of "Component Carriers" having different carrier frequencies.

Here, the transmission unit 22 is configured to adjust the transmission timing of the uplink signal in each of the plurality of "Component Carriers", based on the TA received by the TA reception unit 21.

Note that the transmission unit 22 may adjust the transmission timing of the uplink signal in each of the plurality of "Component Carriers" processed by the same receiver (IFFT) within the mobile station UE, such that the transmission timing becomes the same.

That is, when the "contiguous CA" is performed in the mobile station UE, the transmission unit 22 may adjust the transmission timing of the uplink signal in each of the plurality of "Component Carriers", such that the transmission timing becomes the same.

On the other hand, the transmission unit 22 may adjust the transmission timing of the uplink signal in each of the plurality of "Component Carriers" processed by different receivers (IFFT) within the mobile station UE, such that the transmission timing is different.

That is, when the "non-Contiguous CA" is performed in the mobile station UE, the transmission unit 22 may adjust the transmission timing of the uplink signal in each of the plurality of "Component Carriers", such that the transmission timing is different.

Specifically, as illustrated in FIG. 5, the transmission unit 22 is configured to transmit the uplink signal at a time point earlier, by as much as a time designated by the TA, than a reference time point T in each subframe.

Furthermore, from among a plurality of "Component Carriers" having different carrier frequencies by which CA is performed, which "Component Carriers" correspond to the "contiguous CA", and which "Component Carriers" correspond to the "non-contiguous CA" may be indicated by the radio base station eNB.

In other words, it is possible for the radio base station eNB to set a group of "Component Carriers", which are regarded as the "contiguous CA", to the mobile station UE. Then, it is possible for the radio base station eNB to assign identification numbers by each group and to designate TA different depending on the group based on the identification number.

Furthermore, even when the "non-contiguous CA" is performed, it may be possible to apply the same TA in a certain operation mode.

Consequently, it is possible for the radio base station eNB to set a group of "Component Carriers", to which the same TA is applied, to the mobile station UE, to assign the identification number by each group, and to designate the TA different depending on the group based on the identification number.

Here, the TA reception unit 21 may also be configured to extract the aforementioned TA and the identification number of the group, to which the TA should be applied, from the received "Control Element" which instructs the "TA Command" in the "MAC layer".

In accordance with the mobile communication system according to the first embodiment of the present invention, since it is possible to assign the TA to each CC used in the mobile station UE in which the CA is performed, even when the CA is performed, the reception timing of the uplink signal in the radio base station eNB can be kept in a constant range.

Furthermore, in accordance with the mobile communication system according to the first embodiment of the present invention, only one TA is assigned to the mobile station UE in which only the "contiguous CA" is performed, so that it is possible to avoid the transmission of redundant TA.

Furthermore, in accordance with the mobile communication system according to the first embodiment of the present invention, "Component Carriers", to which the same TA can be applied, are grouped and only one TA is assigned to the group, so that it is possible to avoid the transmission of redundant TA.

The characteristics of the present embodiment as described above may be expressed as follows:

A first characteristic of the present embodiment is summarized in that a mobile communication method, in which a mobile station UE in which CA is performed transmits uplink signals to a radio base station eNB using a plurality of "Component Carriers" (for example, CC #1, CC #2, CC #3, CC #11, CC #12, CC #21, CC #31, CC #32 and the like) having different carrier frequencies, includes: a step A of transmitting to the mobile station UE, by the radio base station eNB, TA (transmission timing adjustment information) to be applied to the plurality of "Component Carriers"; and a step B of adjusting, by the mobile station UE, transmission timings of the uplink signals on the plurality of "Component Carriers" based on the received TA.

In the first characteristic of the present embodiment, in the step A, the radio base station eNB may transmit the same TA to a plurality of "Component Carriers" processed by the same receiver (IFFT) in the mobile station UE.

In the first characteristic of the present embodiment, in the step A, the radio base station eNB may transmit different TAs to a plurality of "Component Carriers" processed by different receivers (IFFTs) in the mobile station UE.

In the first characteristic of the present embodiment, in the step A, the radio base station eNB may transmit identification information of a group of "Component Carriers", to which the same TA should be applied, and the same TA to the mobile station UE.

A second characteristic of the present embodiment is summarized in that a radio base station eNB, which is configured to receive uplink signal transmitted using a plurality of "Component Carriers" having different carrier frequencies from a mobile station UE, includes: a transmission unit 12 configured to transmit TA to be applied to the plurality of "Component Carriers" to the mobile station UE.

In the second characteristic of the present embodiment, the transmission unit 12 may be configured to transmit the same TA to a plurality of "Component Carriers" processed by the same receiver (IFFT) in the mobile station UE.

In the second characteristic of the present embodiment, the transmission unit 12 may be configured to transmit different TAs to a plurality of "Component Carriers" processed by different receivers (IFFT) in the mobile station UE.

In the second characteristic of the present embodiment, the transmission unit 12 may be configured to transmit identification information of a group of "Component Carriers", to which the same TA should be applied, and the same TA to the mobile station UE.

A third characteristic of the present embodiment is summarized in that a mobile station UE, which is configured to transmit uplink signals to a radio base station eNB using a plurality of "Component Carriers" having different carrier frequencies, includes: a TA reception unit 21 configured to receive TA to be applied to the plurality of "Component Carriers" from the radio base station eNB; and a transmission unit 22 configured to adjust transmission timings of the uplink signals on the plurality of "Component Carriers" based on the TA received in the TA reception unit 21.

In the third characteristic of the present embodiment, the TA reception unit 21 may be configured to receive, for a plurality of "Component Carriers" processed by the same receiver (IFFT) in the mobile station UE, the same TA.

In the third characteristic of the present embodiment, the TA reception unit 21 may be configured to receive, for a plurality of "Component Carriers" processed by different receivers (IFFT) in the mobile station UE, different TAs.

It is noted that the operation of the above-described the radio base station eNB or the mobile station UE may be implemented by a hardware, may also be implemented by a software module executed by a processor, and may further be implemented by the combination of the both.

The software module may be arranged in a storage medium of an arbitrary format such as RAM(Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

The storage medium is connected to the processor so that the processor can write and read information into and from the storage medium. Such a storage medium may also be accumulated in the processor. The storage medium and processor may be arranged in ASIC. Such the ASIC may be arranged in the radio base station eNB or the mobile station UE. Further, such a storage medium or a processor may be arranged, as a discrete component, in the radio base station eNB or the mobile station UE.

Thus, the present invention has been explained in detail by using the above-described embodiments; however, it is obvious that for persons skilled in the art, the present invention is not limited to the embodiments explained herein. The present invention can be implemented as a corrected and modified mode without departing from the gist and the scope of the present invention defined by the claims. Therefore, the description of the specification is intended for explaining the example only and does not impose any limited meaning to the present invention.

The invention claimed is:

1. A mobile communication method, in which a mobile station transmits uplink signals to a radio base station using a plurality of carriers having different carrier frequencies, the method comprising:

a step of assigning, by the radio base station, identification information to each group of the plurality of carriers;

a step of transmitting, by the radio base station, Control Element in a MAC layer designating transmission timing adjustment information with the identification information, to the mobile station; and a step of adjusting, by the mobile station, a transmission timing of the uplink signals in the plurality of carriers based on the transmission timing adjustment information designated by the identification information, the identification information being extracted from the received Control Element.

2. A radio base station, configured to:

receive uplink signals transmitted using a plurality of carriers having different carrier frequencies from a mobile station, assign identification information to each group of the plurality of carriers, and transmit, to the mobile station, Control Element in a MAC layer designating transmission timing adjustment information with the identification information, wherein the mobile station adjusts a transmission timing of the uplink signals in the plurality of carriers based on the transmission timing adjustment information designated by the identification information, and the identification information is extracted from the received Control Element.

3. A mobile station, configured to transmit uplink signals to a radio base station using a plurality of carriers having different carrier frequencies, the mobile station comprising:

a reception unit configured to receive Control Element in a MAC layer from the radio base station; and a transmission unit configured to adjust transmission timings of the uplink signals in the plurality of carriers based on transmission timing adjustment information designated by identification information, the identification information being extracted from the received Control Element, wherein the identification information is assigned to each group of the plurality of carriers by the radio base station.

* * * * *